July 16, 1963     M. FELTEN     3,097,626
ANIMAL EXERCISER
Filed Oct. 11, 1962
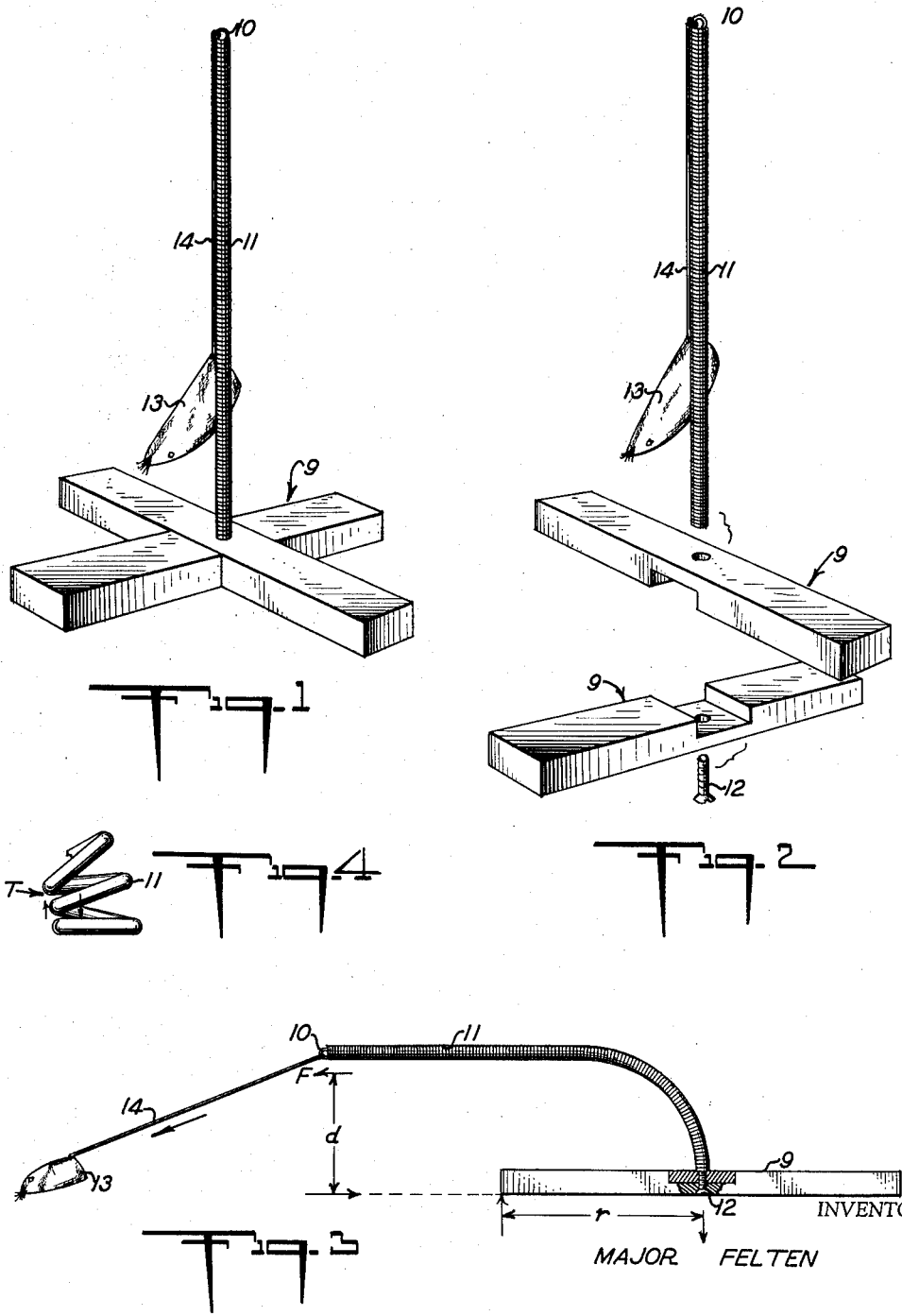
INVENTOR
MAJOR FELTEN
BY Henry Heyman
ATTORNEY United States Patent Office 3,097,626
Patented July 16, 1963

3,097,626
ANIMAL EXERCISER
Major Felten, Box 2233, Galisteo, N. Mex.
Filed Oct. 11, 1962, Ser. No. 232,640
1 Claim. (Cl. 119—29)

This invention relates to exercising devices for animals, and more particularly it relates to an indoor exerciser for cats.

It is well known in the art that cats will exercise and play with devices covered with fabric. If an exerciser particularly attractive to cats is not provided, the animal is apt to tear, fret and otherwise seriously damage household furniture such as overstuffed sofas, chairs and the like.

It is well known that a small stuffed object suspended on a string is particularly attractive to a cat, and that the animal will ignore stuffed furniture in favor of such a device.

It has been discovered that if the small stuffed object is suspended from the top of a spring so as to have the characteristic of liveliness, that the cat will play with such a device until the need for exercise and play is completely satisfied.

An inherent difficulty in such devices resides in their susceptibility to toppling over.

It is necessary, therefore, in order for such devices to be practical, that the manner for supporting the vertical spring on or in a base which is light, and easily handled, be such that the device will not topple over when the cat tugs on the stuffed article.

Accordingly, the objects of this invention are:

To provide a device so attractive to a cat, that the cat will prefer to exercise with the device rather than claw at stuffed furniture, rugs or draperies.

To provide a device which induces a cat to play and exercise.

To provide a cat exercising device which is collapsible and which may be packed in a small package for shipping and storage.

To provide a device of this class which is very simple and rugged of construction.

To provide an animal exerciser which may be utilized in living rooms without damage or annoyance.

The manner of achieving the above enumerated and other objects will become apparent as the following description proceeds with reference to the drawing made a part of this specification.

In the drawing:

FIGURE 1 is the cat exerciser in normal non-use condition.

FIGURE 2 is an exploded view of the device showing its very simple, economical and rugged construction.

FIGURE 3 is the exerciser in the most extended position when in use.

FIGURE 4 is an enlarged fragmentary showing of the spring to illustrate a principle of the invention.

The device, in brief comprises a base 9 of cruciform shape, an elongated helical spring and a bag suspended from the free end of the spring. The helical spring 11 has an eye 10 at its upper end and is rigidly affixed at its lower end to the center of the base by screw 12. A ball, or bag 13 containing a substance attractive to cats is secured to the lower end of a string 14 or cord which string or cord is in turn secured at its upper end to the eye of the spring.

The device is exceedingly simple, consisting of two parts for the base, a screw, a helical spring and a bag with its suspending cord. The base parts fit together in a simple interlocking cross lap joint.

The device of FIGURE 3 is shown completely bent over due to the cat tugging on the bag. It is noted that it is preferred that the suspension for the bag be about two thirds the length of the spring. The helical spring preferably has a length of the order of twelve inches. The combined lengths are, so related to the nature of the spring that in the event the cat grabs the bag and rolls, the device does not topple and in the event of severe pull, simply slides the base. Part of the spring is shown in expanded form in FIGURE 4.

This feature of non-tumbling is accomplished by a corelation of the torsion characteristic of the wire in the helix with the geometry and mass of the base.

For example, an assembly on a base of white pine pieces eleven inches long, seven-eighths of an inch thick and one and three-quarters of an inch wide weighs approximately three-fourths of a pound. The radius of tumbling of the center of mass about the nearest axis which is a line between two adjacent base legs is four and one-half inches. Therefore the moment necessary to topple the device over is approximately 3.37 pound inches. The helices of the spring when being bent over rotate about those portions of the helix on the inside of the arc. Therefore, the phenomena of the spring is essentially one of torsion and it follows that the device will not topple if a helical spring is selected, the spring wire of which has a torsion characteristic of less than 3.37 pound inches. It is desirable that in order for the device to be lively that the torsion characteristic of the spring be not less than a predetermined amount of the tumbling moment of the base about its shortest tumbling radius.

A further requisite in the construction of the device is that at least the lower third and preferably the entire length of the stanchion element be a spring helix. In accordance with the characteristic of a cantilever, practically all the bending takes place in the lower helices. This fact is of importance because a second tumbling moment comes into play, if the cat severely pulls on the bag in a horizontal direction. As shown in FIGURE 3, this pull becomes a turning moment equal to the product of the pull on the spring and the distance from the bottom of the base. This tumbling moment plus the resistance to torsion of the spring must not equal the tumbling moment of the base.

This relationship is as follows:

$$Fd+T=Mr$$

Wherein $F$ is the cats horizontal pull on the spring, $d$ is the distance between the bent over spring and the bottom of the base, $T$ is the tensional resistances of the spring wire in the spring, $M$ is the mass of the assembly, and $r$ is the radius of tumbling.

I have found that a spring having a resistance to torsion of three inch ounces is entirely safe to use in the above example and that although the exerciser is lively, it cannot topple, that is, the base will slide on any surface without toppling. Consequently, I conclude that the torsion characteristic of the helical spring be chosen within ten to thirty percent of the tumbling moment of the base. These ratios hold true for any size of the device.

I have described a preferred embodiment in which the base is of cruciform shape for knock-down quality for compactness in packaging, shipping and storing. I have shown the helical spring as a unitary multiple helix. However, the essential characteristics reside in the non-tumbling features combined with liveliness in the device. Accordingly, I desire not to be limited to the exact requirements of the preferred embodiment shown, but instead, to be limited only by the recitations in the claim taken in view of the prior art.

What I claim is:

A cat exerciser comprising a demountable cruciform base, an elongated helical spring, a screw having a diameter slightly greater than the internal diameter of said helical spring, said screw passing vertically up through the center of the base into the lower end of said spring to thereby hold the lower end of the helical spring vertical, a flexible suspensory element having a length of less than the length of the helical spring being secured to the upper end of the spring, a stuffed bag being attached to the lower end of said suspensory element, said helical spring being formed of spring wire having a torsional resistance of not over thirty percent of the tumbling moment of the base.

References Cited in the file of this patent

UNITED STATES PATENTS

| | | |
|---|---|---|
| 2,698,598 | Hadley | Jan. 4, 1955 |
| 2,808,807 | Winton et al. | Oct. 8, 1957 |
| 2,833,244 | Bohlman | May 6, 1958 |